(12) United States Patent
Garcia Navarro

(10) Patent No.: US 10,537,797 B2
(45) Date of Patent: *Jan. 21, 2020

(54) SIMULATED VIDEO GAME CHANNEL

(71) Applicant: DISH Technologies L.L.C., Englewood, CO (US)

(72) Inventor: Carlos Garcia Navarro, Boulder, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,308

(22) Filed: Apr. 30, 2018

(65) Prior Publication Data

US 2018/0243649 A1 Aug. 30, 2018

Related U.S. Application Data

(63) Continuation of application No. 14/584,687, filed on Dec. 29, 2014, now Pat. No. 9,993,726.

(51) Int. Cl.
*A63F 13/32* (2014.01)
*A63F 13/79* (2014.01)
*A63F 13/338* (2014.01)
*A63F 13/73* (2014.01)

(52) U.S. Cl.
CPC ............ *A63F 13/32* (2014.09); *A63F 13/338* (2014.09); *A63F 13/73* (2014.09); *A63F 13/79* (2014.09)

(58) Field of Classification Search
USPC .......................................................... 463/31
See application file for complete search history.

(56) References Cited

U.S. PATENT DOCUMENTS

| | | | |
|---|---|---|---|
| 2007/0006275 A1* | 1/2007 | Wright | H04N 21/44204 725/133 |
| 2009/0029754 A1* | 1/2009 | Slocum | A63B 24/0087 463/5 |
| 2009/0258700 A1* | 10/2009 | Bright | A63F 13/10 463/31 |

* cited by examiner

*Primary Examiner* — Pierre E Elisca
(74) *Attorney, Agent, or Firm* — Seed IP law Group LLP

(57) ABSTRACT

Simulated video game channel systems and methods are disclosed that allows users to connect their video game consoles to a device, such as a set-top box, and to then connect over a gaming channel that is identified by an electronic programming guide (EPG). Both audiovisual broadcast content channels and video game channels are displayed on the same integrated EPG. An individual may either watch the video game action or participate in the video game. A video game channel may be either public, viewable by all service provider subscribers, or private, viewable to only a subset of subscribers. The system also analyzes the video gaming habits of the user to determine recommendations for audiovisual broadcast content and video on demand content to present to the user.

11 Claims, 11 Drawing Sheets

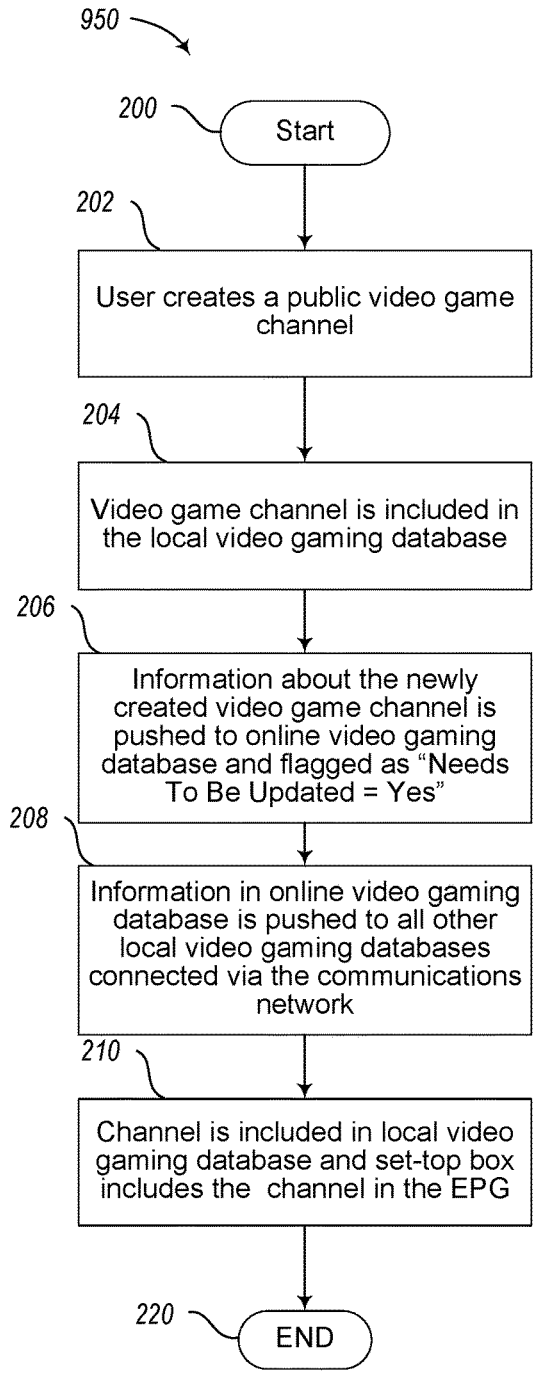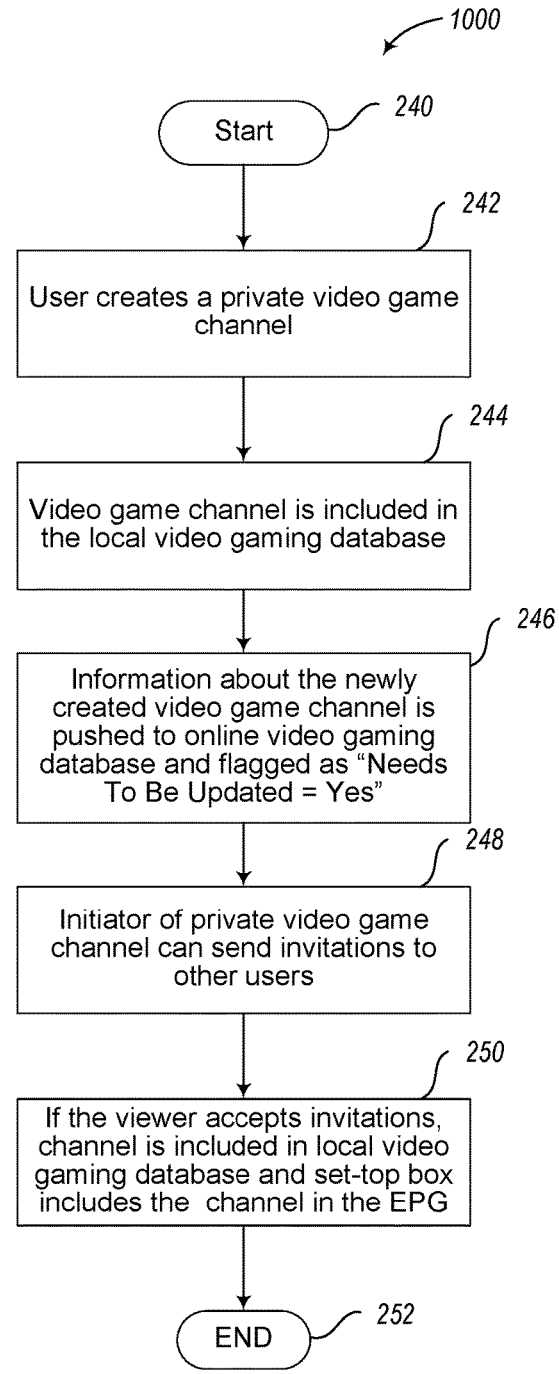
FIG. 8A
FIG. 8B

SIMULATED VIDEO GAME CHANNEL

BACKGROUND

Technical Field

The present disclosure relates to the field of video game entertainment, and in particular, to a service that allows multiple video game players to share video game play over a video game channel that is identified in an electronic programing guide.

Description of the Related Art

Video gaming systems that provide video game players with the ability for single-user or multi-user gameplay include systems such as Microsoft Xbox, Sony PlayStation, and Nintendo Wii. Examples of games that may be played are action games such as Mortal Kombat or Doom; role-playing games including real-time strategy games such as RuneScape, World of Warcraft and Halo; sports games like NCAA Football, or Madden football; simulation games like Second Life and the Sims series; and others. In addition to playing these games on dedicated systems, they may also be played by users on Smartphones, hand-held gaming devices, laptops, tablets or desktop computer systems.

These video gaming systems may also be interconnected with other systems to allow multiple users to experience multiplayer game play remotely with other users. Examples include the Microsoft Xbox LIVE™ system and Sony Entertainment Network that allow players to connect with each other while playing games on those respective platforms. Players can also connect via the Internet for multiplayer online play, such as playing World of Warcraft on personal computers played among tens of thousands of players simultaneously connected via the Internet.

Typically, individuals who wish to view play of these games either need to register as gaming participants, or to view play that has already been recorded by players and posted to video sites such as YouTube™

BRIEF SUMMARY

A simulated video game channel system allows users to connect their video game consoles to a device, such as a set-top box, and to then connect with each other over a gaming channel that is identified by an electronic programming guide (EPG). Both audiovisual broadcast content channels and video game channels are displayed on the same EPG. A player may either select a channel on the service provider network (e.g., DirecTV™, Dish Network™) to play with other users in an existing game, or create a new channel to play a new game. An individual may either watch the video game action or participate in the video game. A video game channel may be either public viewable by all service provider subscribers, or private where only a subset of subscribers, for example, those subscribers invited to access the channel, are able to view or play the game through the set-top box.

Furthermore, the audiovisual broadcast content viewed, and the video games either viewed or played, may be analyzed to determine relationships that may result in recommendations to the individual. This analysis may take into account, for example, the name of the content or the genre of the content. For example, a user may enjoy watching action adventure movies, and the system would be able to recommend video game channels the user may either watch or play related to action-adventure games.

In addition, this functionality may be implemented through one or more databases that track available content and usage either locally on the user system, or regionally based on databases accessible through a communications network.

BRIEF DESCRIPTION OF THE SEVERAL VIEWS OF THE DRAWINGS

FIGS. 8A-8B show implementations of a flow diagram for creating a public video game channel and a private video game channel.

DETAILED DESCRIPTION

Figure 1:
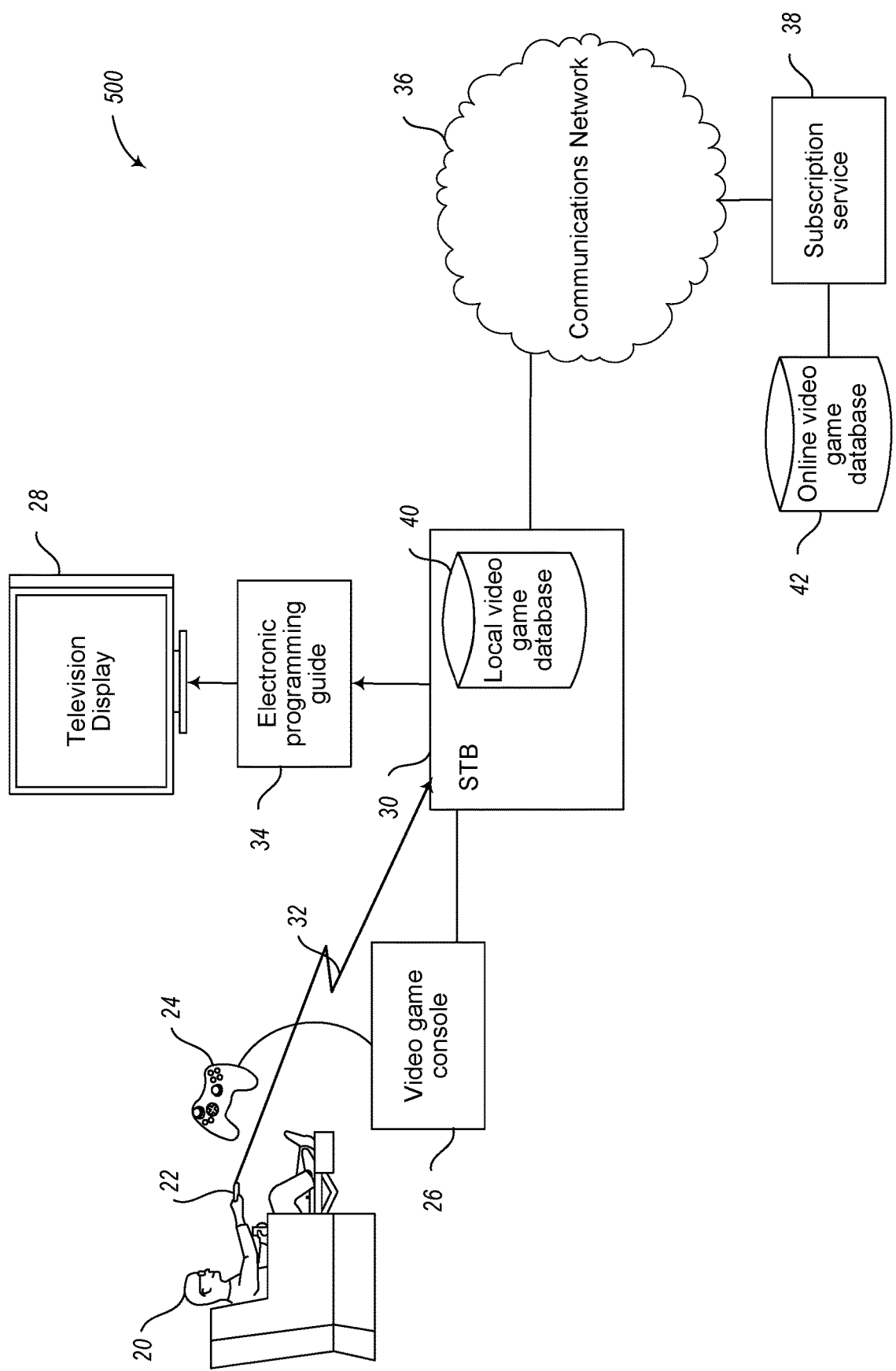
FIG. 1 shows one implementation of a user interacting with audiovisual broadcast content and with a video game channel using a video game console and a set-top box.

FIG. 1 contains diagram 500 that shows one implementation of a simulated video game channel. A user 20 is able to communicate with set-top box 30 using remote control 22 over remote control communication link 32. The user 20 is also able to communicate with video game console 26 using video game controller 24 that is connected to the console. In one example implementation, the video game console 26 is connected to the set-top box 30. The television display 28 is connected to the set-top box 30, and is able to display audiovisual broadcast content information received by the set-top box 30 from communications network 36. Examples of a communications network 36 includes audiovisual broadcast content that is provided by content distributors such as Dish Network™ and DirecTV™

The communications network 36 also provides information in the form of an electronic programming guide 34 that describes the name, in addition to other information, about audiovisual programs that are available on different channels at various time slots. By viewing electronic programming guide 34, a user 20 is able to determine what programs are available for desire viewing.

In addition, the electronic programming guide 34 may also contain information about video game channels that are available for the user 20 either view or to play. In this way, the user 20 is able to view the electronic programming guide 34 and to get information on channels available to the user 20 either watching audiovisual broadcast content or watching or playing video games.

The user 20 is able to connect video game console 26 to a set-top box 30 and to control the video game console 26 using video game controller 24. In different implementations, a single device may be used to control both the video game console 26 and the set-top box 30. In other implementations, these devices may be combined into one unit. In still other implementations, the user 20 is able to connect laptops, PCs, smart phones, tablets or any other device to the set-top box 30 in order to simulate a channel, displayable on an electronic program guide 34, that shows video game action as a channel.

For example, multiplayer games, such as those played using a video game subscription service 38, which may or may not be different from the audiovisual broadcast content distribution service, connected to a communications network 36, may allow player interaction with other video game subscribers that would like to either play or watch the action of the video games on one or more channels. An example of a video game subscription service 38 is the Xbox™ live service. By connecting the video game console 26 to the set-top box 30, the set-top box 30 will manage to connect all the players to the same video game through communications network 36, and to display the action to the individual user on television display 28. The action as displayed will be associated with the channel that may be accessed through the electronic programming guide 34 as a regular channel. In one implementation, a video game channel may have one of two types of profiles: public and private. A public profile video game channel can be watched by other subscribers even if they are not connected to play the video game. A private profile channel can be accessed only by a user 20 that created the channel with the private profile, and by those that have received and have accepted an invitation from the channel creator.

Information about all video game channels, including public and private channels, may be stored in an online video game database 42 to which all video distribution service subscribers have access.

Additional databases, such as a local database that is internal to set-top box 30, or a local video game database 40, is included and contains information related to the video game channels and the associated user 20. In one or more implementations, the local video gaming database 40 contains only the public channels and the private channels to which the user 20 has access. In other implementations, information about the video games associated with each channel are included, including information such as genre, participants, e.g., people playing the game, game type, etc. This information may be presented on the television display 28.

Some or all of this information may also be found on the online video gaming database 42. The online video gaming database 42 and local video gaming database 40 may synchronize periodically in order to add new public channels that exist in the online video gaming database 42 but not in all of the local video gaming database 40 databases yet. For example, the local video gaming database 40 may contain a listing of all of the available public video game channels, the private video game channels created by the user 20, and the private channels to which the user 20 has been invited and has accepted. For example, when user 20 creates a public profile channel, this information is sent over communications network 36 to the online video gaming database 42. In some implementations, a flag in the online video gaming database 42 database may indicate that channels need to be updated, for example, that the information about the newly created channel needs to be pushed to each user's 20 set-top box 30 so that the information can be included in the local video gaming database 40. For example, a database field titled "last update" in the local video gaming database 40 may indicate the last time the video game channels were updated.

In some implementations, the set-top box 30 will use information in the local video gaming database 40 to build the video game channels in the electronic programming guide information 34. In order to do this, the set-top box 30, may combine event information, for example from Event Information Tables sent with linear programming via communications network 36 or included as metadata with events, such as with video-on-demand (VOD) movies or other programming. This is described further below.

Both the online video gaming database 42 and local video gaming database 40 contain information regarding the genres of different video games. This information may be used by a recommendation engine in order to recommend other video games or audiovisual broadcast programming events from a service provider. Note that audiovisual broadcast events may come from satellite networks, cable networks, internet protocol television networks, terrestrial broadcast television and the like. For example, if user 20 either joins, plays, or watches a video game such as Jurassic Park™, then the recommendation engine may flag movies or other audiovisual programming events that are tagged with the genres of adventure, sci-fi or action, and recommend them to the user 20.

In other implementations, a user 20 may be offered a special communication channel to enable the user 20 to communicate with other players playing a video game identified with a channel in electronic programming guide information 34. This communication channel may be public, e.g., visible to all players, or private, e.g., only visible to some other participants. The players may be able to talk with each other while the communication channel carries the audio. In other implementations, a player can talk to other players and the audio communication is translated into text messages that would be displayed on the television display 28.

Figure 2:
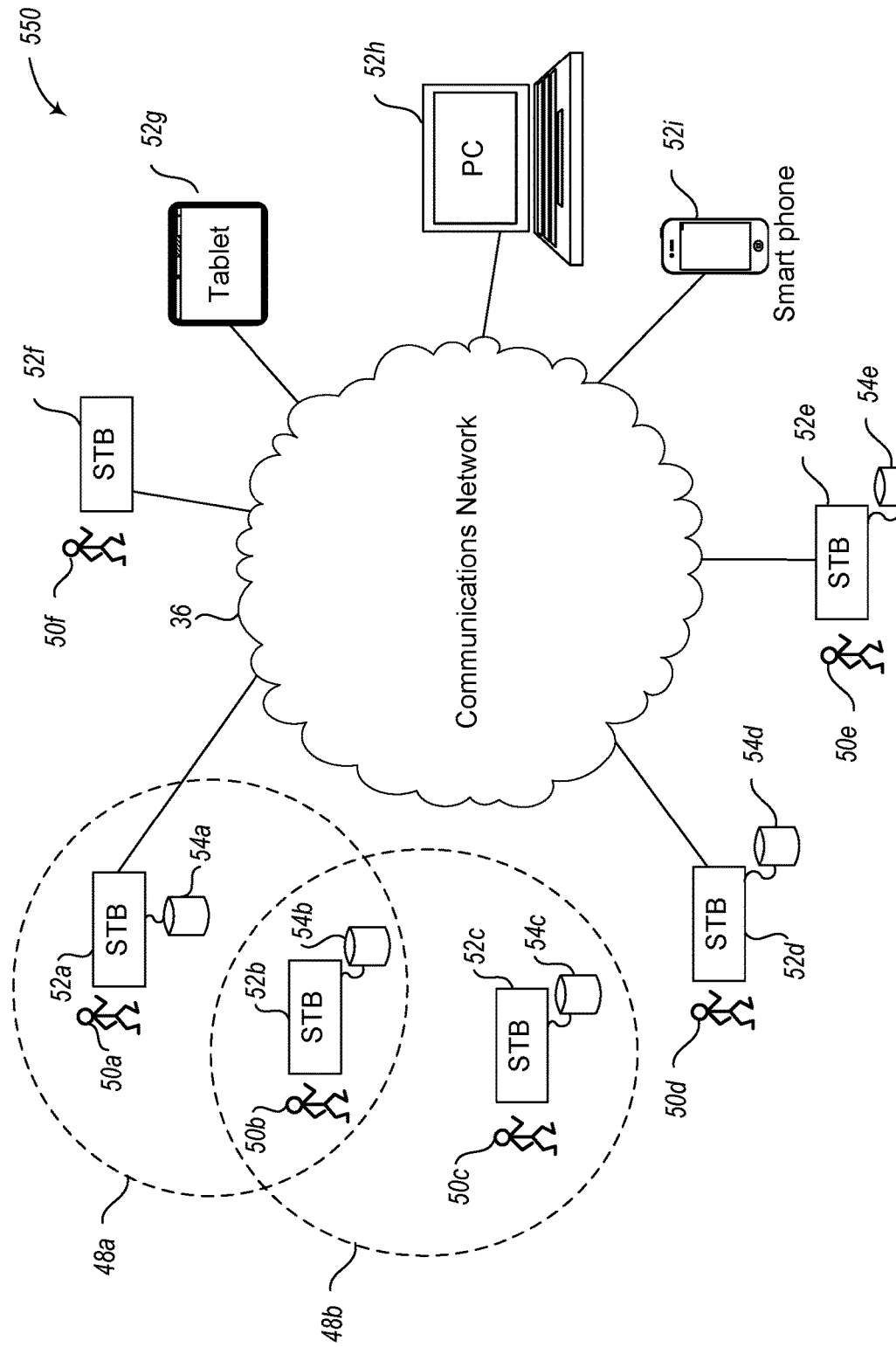
FIG. 2 shows one implementation of a number of users with set-top boxes interacting with audiovisual broadcast content and with video game channel content through the communications network, with different groups of users involved in private channels.

FIG. 2 contains a diagram 550 that shows a multiuser environment for playing games using a simulated video channel. Individual users 50a-50f are associated with individual set-top boxes 52a-52f implementing at least part of the simulated video channel. Other example implementation hardware is also shown as a tablet 52g, personal computer 52h, and smart phone 52i. Examples of local video gaming databases 54a-54e are also shown. As described above, users 50a-50f, are able to create new video game channels that are either public or private. Public video game channels are able to be viewed by all set-top boxes 52a-52f. Private video game channels are only able to be viewed by the private channel creator, in addition to any other user who has received and accepted an invitation to join the video game channel.

FIG. 2 shows example configurations of users involved in one or more private channels. Each of set-top boxes 52a-52f belonging to users 50a-50f are connected through a communications network 36. In one example, a user 50a has created a video game channel, has invited another user 50b to join that channel, and the invitation was accepted. This creates a channel that is a private channel involving only these two users 50a, 50b and is identified in the figure by a dashed circle 48a. In this example, other users 50c-50f are not able to view the private channel as a part of the electronic programming guide information 34 or gain access to the contents of the video game channel for either viewing or playing. In some implementations, the private channel indicates who may join the video game on a video game channel, but others outside of the private channel may be able to view the video game play.

Similarly, dashed circle 48*b* shows an analogous example of a private channel between two users 50*b* and 50*c*. In this example, one user 50*b* is a member of two different private channels, where each of the other users 50*a* and 50*c* are members of only one private channel.

Figure 3:
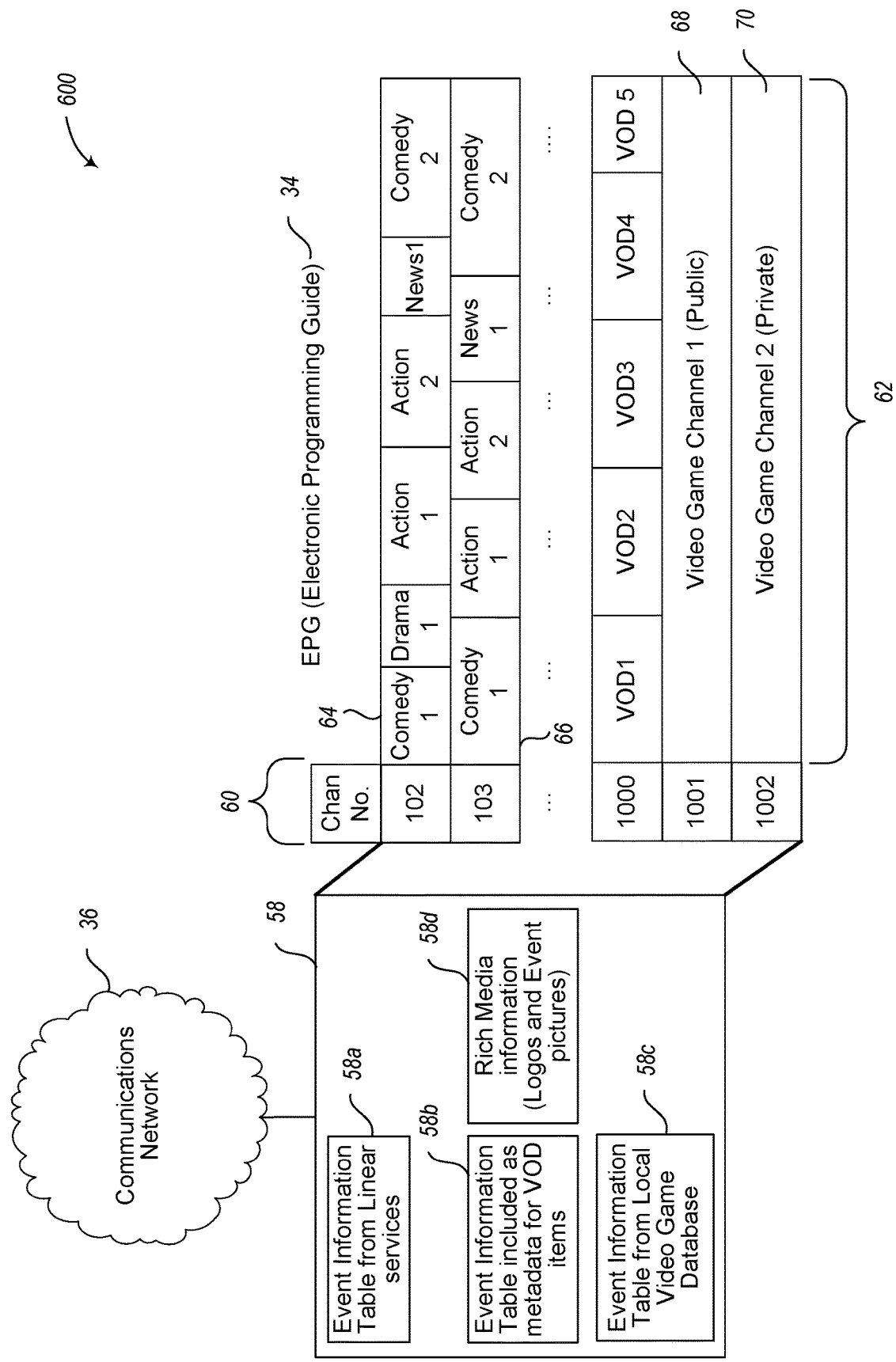
FIG. 3 shows one implementation of an electronic programming guide that describes both audiovisual broadcast content and video game channel content.

FIG. 3 is a diagram 600 that shows an example of electronic programming guide information 34 that is received from one or more sources 58 from an audiovisual distributor, a broadcaster or content provider, for example, Dish Network™ or DirecTV™, via communications network 36. In one or more implementations, the sources include event information tables 58*a* received from linear services, which include programming for each channel that is sent in real time that allows a user 20 to tune into a specific channel and immediately view the content received on that channel. Another source includes event information tables that are included as metadata for video-on-demand items 58*b*, which includes programming that is not received in a linear way, but instead is specified such as by a selection from a menu for downloading and/or immediate watching. Yet another source includes event information tables 58*c* from the local video gaming database 40. This source includes event information with respect to video game channels that are available for either viewing or for play for a user 20 associated with a set-top box 30. In other embodiments, event information tables from online video gaming database 42 may also be included.

In addition, rich media information 58*d* may also be provided to populate electronic program guide 34. This rich media may include logos and event pictures that visually depict an event or identify a channel by, for example, using a trademark logo to identify the event or channel. In addition, various genres may be identified visually by the use of logos or graphics. For example, associated with electronic program guide 34, a channel designator 60 may include a specific channel number, or could be augmented with a logo representing the content provider associated with that channel. For example, a picture of Mickey Mouse™ associated with the Disney Channel.

The main portion of the electronic program guide 34 includes a list of events that occur in various time slots in a particular channel 60. Each event is graphically represented as existing in the timeslot. For example, the audiovisual event on channel 102 "Comedy 1" 64 will end before the audiovisual event on channel 103 "Comedy 1" 66 ends. At the lower part of the electronic program guide 34 there are two video game channels 62 listed. The first is "video game channel 1" 68 associated with channel 1001, and is a public video game channel, meaning that any subscriber to the video distribution service, e.g., DirecTV™ or Dish Network™, may view that video game channel. The second is video game channel 2 70 associated with channel 1002, which is a private channel, meaning that only the channel creator are those that have accepted an invitation to join the channel by the channel creator are able to view the channel.

Figure 4:
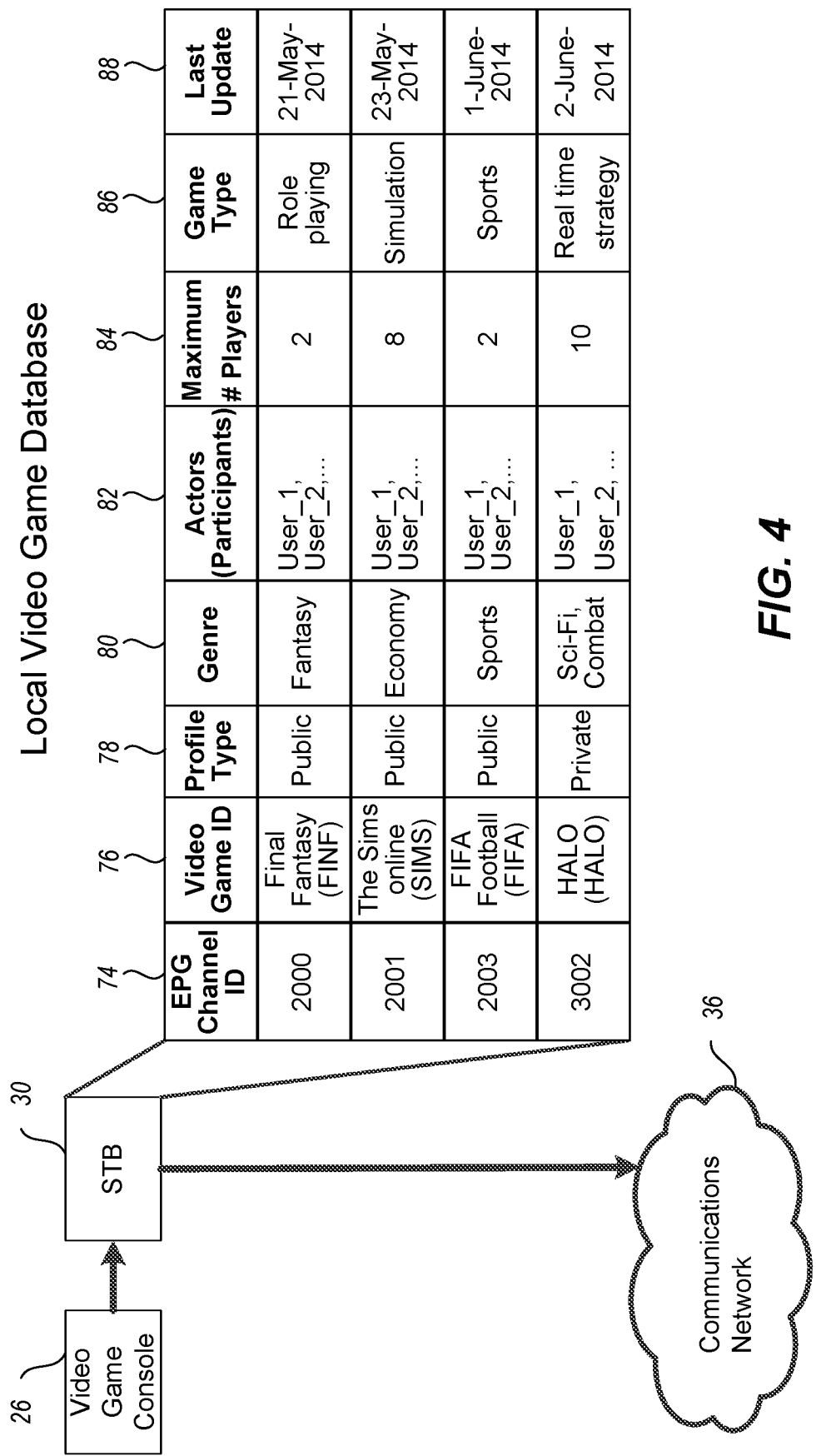
FIG. 4 shows one implementation of a local video game database that resides locally on a user's receiving device.

FIG. 4 shows diagram 650 of one implementation of the structure and contents of the local video game database 40. In one or more implementations, the local video gaming database 40 resides within set-top box 30, which is connected to video game console 26. Both are able to communicate via communications network 36.

The electronic programming guide channel ID 74 identifies the numeric channel associated with any particular video game channel. Next, the video game ID 76 uniquely identifies the video games being played. This may be done through a description of the game name, e.g., "Final Fantasy", through an abbreviation "FINF" or through a graphical image (not shown). In addition, the video game ID 76 may also identify the video game console that is used for play, for example, Xbox™ or PlayStation™

The next column represents profile type 78, which may be either public or private. A public channel indicates that any member of the video distribution subscription service is able to view the gameplay on the channel. A private channel indicates that the channel creator has invited one or more users to participate in the video game channel and these users have accepted the invitation. Genre 80 describes the one or more genres describing the video game. For example, the game "Final Fantasy" falls under the genre fantasy, the game "The Sims" falls under the genre economy, "FIFA Football" falls under the genre sports, and "Halo" falls under the genres sci-fi and combat. The next column, actors/participants 82, describes a list of those users who are participating in the gaming experience. These participants may be identified by a unique user ID, by email name, by full name, or by one or more names they are known by within one or more video games, e.g., "Scullkiller." The maximum number of players 84 indicates the maximum number of active participants in gameplay that are allowed. When this number is exceeded, no additional players are allowed to join. Instead, they may be allowed to view the video game play until a player drops out, at which time another player may join.

The next column, game type 86, identifies the type of game that is being played. The examples given here are role-playing, simulation, sports and real-time strategy. The final column, last update 88, describes the date at which the information for the corresponding channel ID was last updated.

Figure 5:
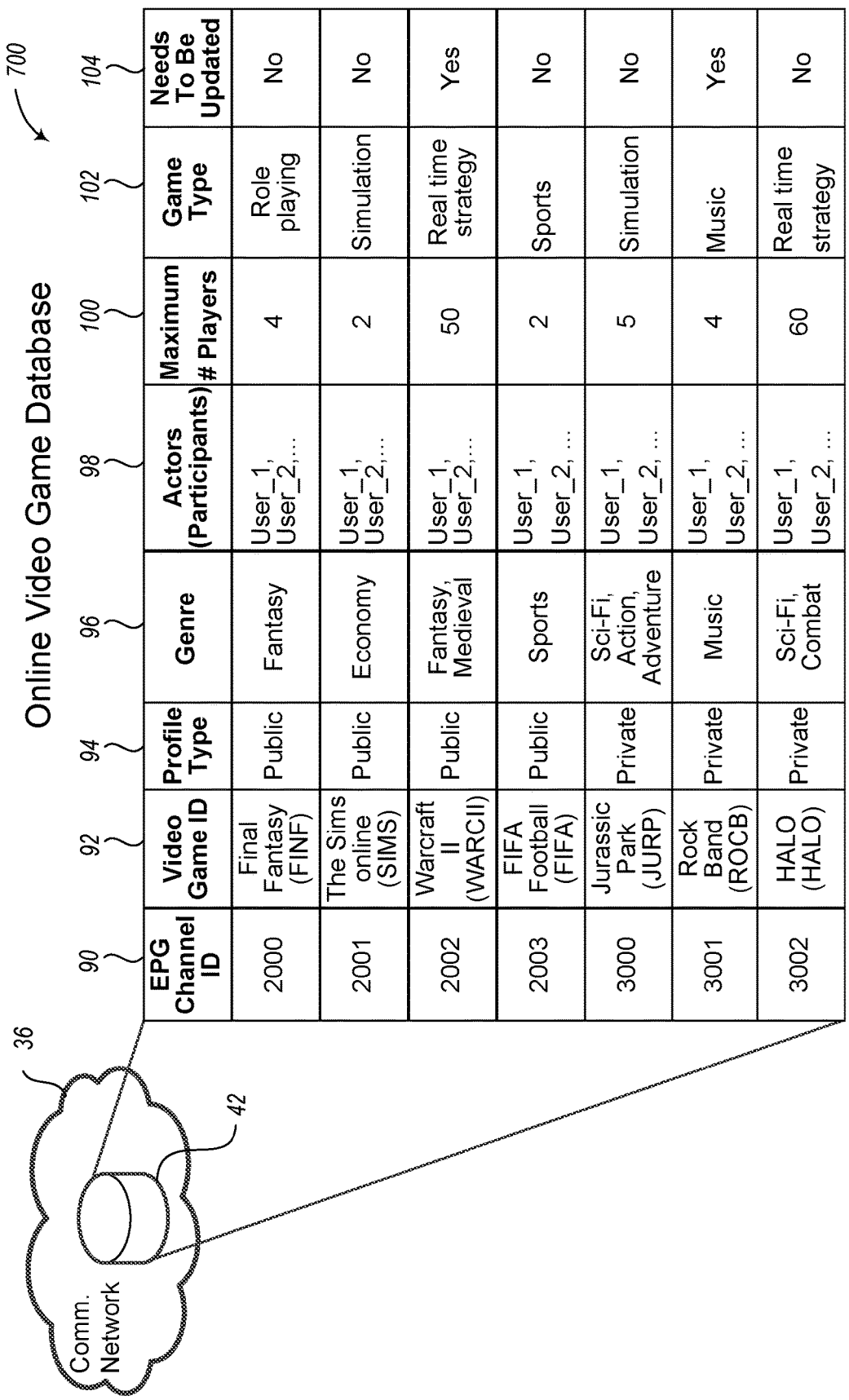
FIG. 5 shows one implementation of an online video game database that is accessible via a communications network.

FIG. 5 shows diagram 700 of one implementation of the structure and contents of the online video game database 42. In one or more implementations, the online video gaming database 42 resides outside of the set-top box 30 as a cloud-based drive accessible via communications network 36.

The electronic programming guide (EPG) channel ID 90 identifies the numeric channel associated with any particular video game channel. In one or more implementations, a predefined range of numbers may be used to identify public and private video game channels within electronic program guide 34. For example, a range of channel IDs 2000-2999 may be defined for public video game channels while a channel ID range of 3000-3399 is defined for private video game channels.

Next, the video game ID 92 uniquely identifies the video games being played. This may be done through a description of the game name, e.g., "Final Fantasy", through an abbreviation of "FINF," or through a graphical image (not shown).

In addition, the video game ID 92 may also identify the video game console that is used for play, for example, Xbox™ or PlayStation™

The next column represents profile type 94, which may be either public or private. A public channel indicates that any member of the video distribution subscription service is able to view the gameplay on the channel. A private channel indicates that the channel creator has invited one or more users to participate in the video game channel and these users have accepted the invitation. Genre 96 describes the one or more genres describing the video game. For example, the game "Final Fantasy" falls under the genre fantasy, the game "The Sims" falls under the genre economy, "FIFA Football" falls under the genre sports, and "Halo" falls under the genres sci-fi and combat. The next column, actors/participants 98, describes a list of those users who are participating in the gaming experience. These participants may be identified by a unique user ID, by email name, by full name, or by one or more names they are known by within one or more video games, e.g., "Scullkiller." The maximum number of players 100 indicates the maximum number of active participants in gameplay that are allowed. When this number is exceeded, no additional players are allowed to join. Instead, they may be allowed to view the video game play until a player drops out, at which time another player may join.

The next column, game type 102, identifies the type of game that is being played. The examples given here are role-playing, simulation, sports, music and real-time strategy. The final column, "needs to be updated" 104, indicates whether updates to the information described for each EPG channel ID 90 need to be pushed to the individual local video gaming databases 40 located at each set-top box.

Figure 6A:
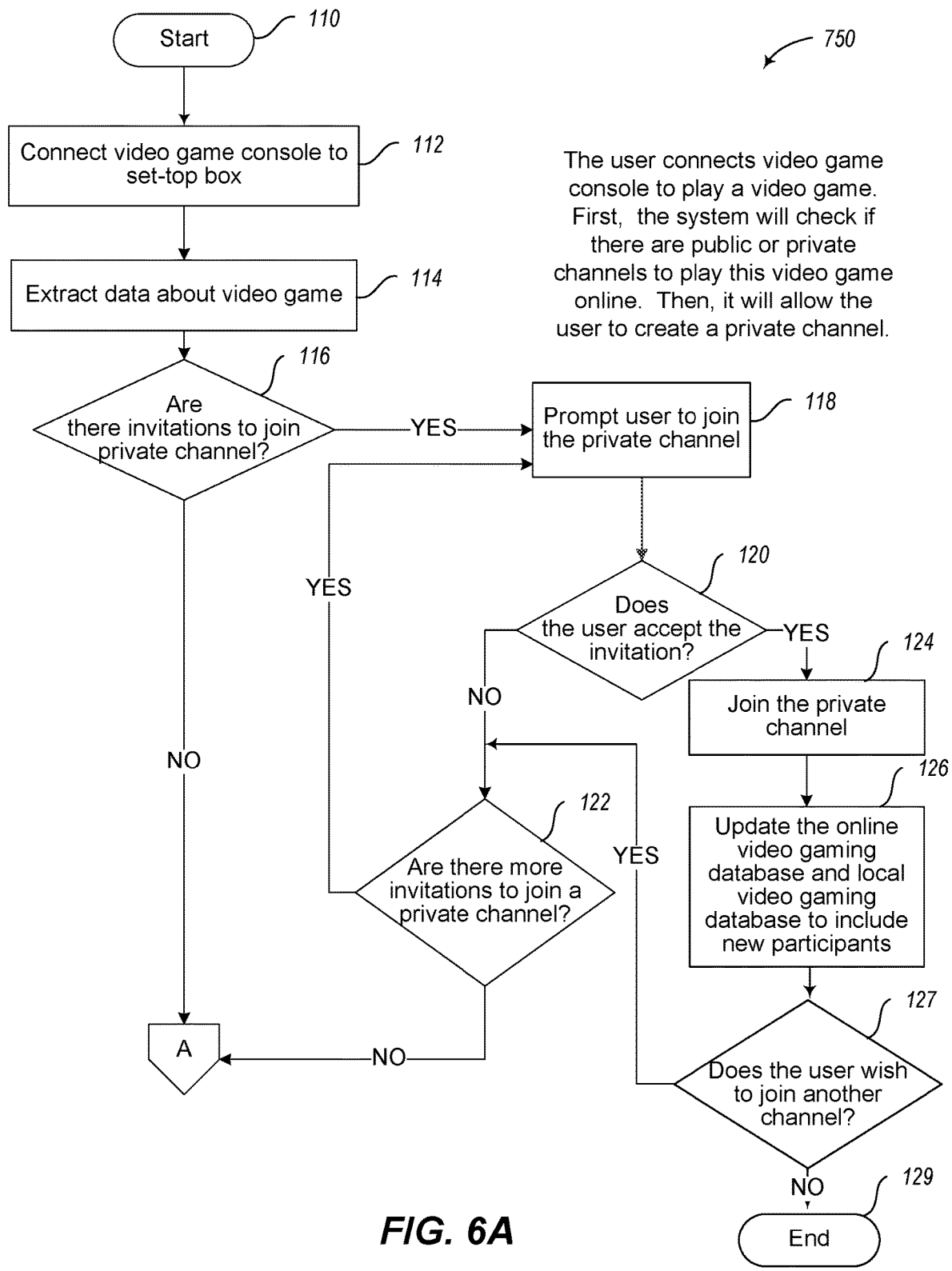
FIGS. 6A-6B shows one implementation of a flow diagram for creating, connecting to, and managing one or more video game channels that may be designated either public or private.
Figure 6B:
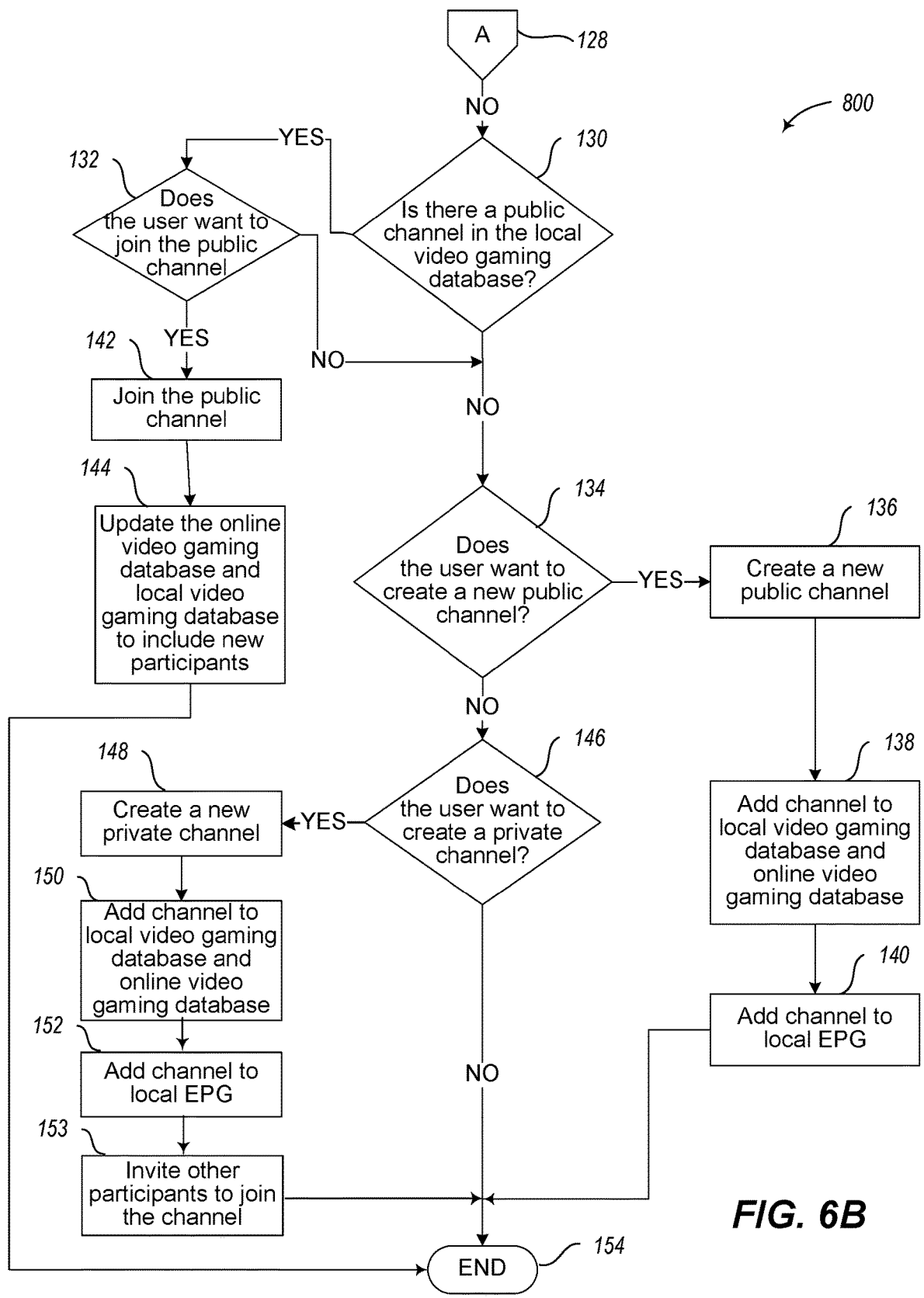

FIGS. 6A-6B show flow diagrams 750 and 800 that describe an implementation of a flow diagram for identifying a video game channel for play, or for creating a public video game channel. Starting with FIG. 6A and flow diagram 750, the method starts at step 110.

At step 112, the video game console 26 is connected to the set-top box 30. In one or more implementations, this may take the form of either a hardwired connection between the 2 components, or may take the form of a wireless connection such as a Bluetooth, infrared, or Wi-Fi connection.

At step 114, data is extracted about the video game that is running in the video game console 26. This data may be extracted by querying the video game software itself, or may be entered manually by the video game user into a user interface display. This data includes one or more data fields such as video game ID, genre, maximum number of players, game type, etc., that appear as fields in either the online video gaming database 42 or local video gaming database 40.

At step 116, the method checks if there are invitations to the user 20 to join any private channels. If there are no invitations, then the method continues to step 130 of FIG. 6B. If there are invitations, then at step 118 the user is prompted to join the private channel. At step 120 if the user accepts the invitation, then at step 124 the user joins the private channel, which may include sending an acknowledgement by communication back to the individual who invited the user 20 to join the channel. At step 126, the online video gaming database and local video gaming database are updated to include the new participant. At step 127, if the user wishes to join another channel, then the method moves to step 122. Otherwise at 129 the method ends.

If the user does not accept the invitation to join, then at step 122 the method determines if there are more invitations to join a private channel. If so, the method moves to step 118. If not, then the method continues to step 130 of FIG. 6B.

FIG. 6B shows flow diagram 800 that describes the creation of a public video game channel, creation of a private video game channel and a user joining a public channel. The method starts at 128 (connector A).

At step 130, the method determines if there is a public video game channel in the local video gaming database that the user wishes to either view or play. For example, the user 20 may connect the video game console 26 to the set-top box 30 and request to play "Final Fantasy." If so, the method proceeds to step 132 to determine whether the user wants to join the public channel as either a viewer or a game player. For example, to determine if there are public video game channels where people are already playing "Final Fantasy." If not, the method proceeds to step 134. If so, then at step 142 the method joins the user to the public channel, and at step 144 updates the online video gaming database and local video gaming database to include the user as a new participant, and the method ends at step 154.

At step 134, the method determines whether the user wants to create a new public channel, for example, to play the game "Final Fantasy." In one or more embodiments, any user that subscribes to the video distribution service has a right to create a video game channel. If so, at step 136 the method creates a new public channel. In the example, the user 20 will begin to play the game "Final Fantasy." At step 138, the channel is added to the local video gaming database and online video gaming database, and at step 140 the channel is added to the local electronic programming guide. At this point, all other subscribers of the video distribution service will be able to watch the Final Fantasy game being played by the user 20 by selecting the channel indicated by the EPG. At step 154, the method ends.

At step 146, the method determines whether the user wants to create a private channel. If so, at step 148 the method creates a new private channel. At step 150, the method adds the channel to the local video gaming database and online video gaming database, and at step 152 the method adds the private video game channel to the local electronic programming guide. Similarly to the public channel creation described above, this sequence of method steps would create a private video game channel for the user 20, which could only be accessed by other users if user 20 specifically invited them to view and/or play on the private video game channel. At step 153, the user invites other participants to join the channel.

At step 154, the method ends.

Figure 7:
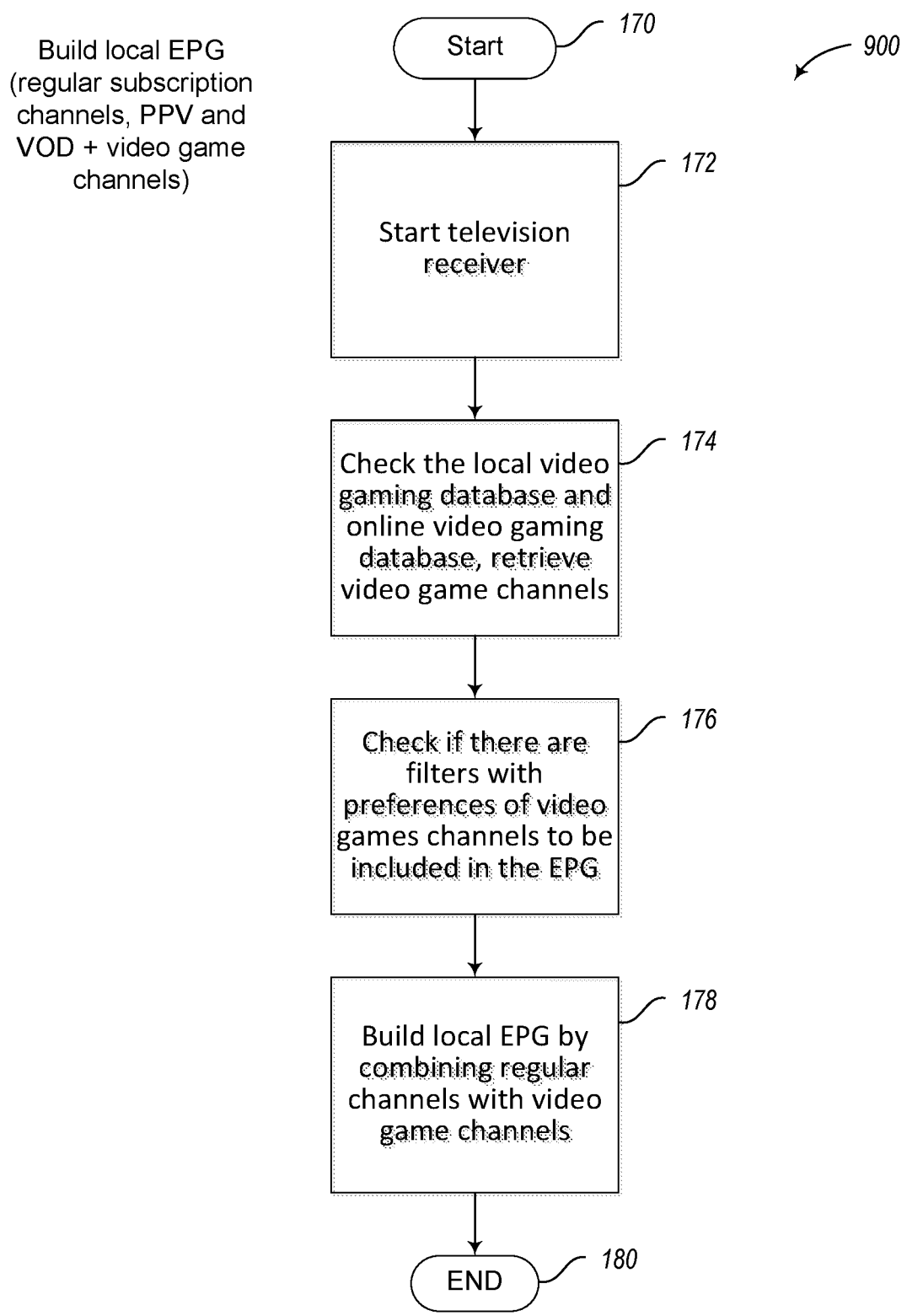
FIG. 7 shows one implementation of a flow diagram for building a local electronic programming guide

FIG. 7 shows diagram 900 which is one implementation of a flow diagram for building a local electronic programming guide 34. The method starts at step 170. At step 172, the method starts the television receiver. In one or more implementations, this is the set-top box 30 that receives audiovisual content from the content distributor that includes the local video gaming database 40 and access to the online video gaming database 42 over communications network 36.

At step 174, the method checks the local video gaming database and online video gaming database video game databases to retrieve available video game channels.

At step 176, the method checks if there are filters with preferences of video game channels to be included in the electronic programming guide. In one or more implementations, these filters are settings that may be customized by the user 20 by manually entering these filters into a user preferences database, or having the method analyze the user's 20 audiovisual viewing habits and/or video game channel viewing and playing habits.

At step 178, the local electronic programming guide is built by combining the electronic programming guide data for audiovisual content channels with the retrieved video game channels.

At step 180, the method ends.

FIG. 8A shows flow diagram 950 which is one implementation of a flow diagram for the interplay between the online video gaming database and local video gaming database databases when creating a public video game channel. At step 200, the method starts.

At step 202, the user indicates that a public video game channel is to be created.

At step 204, the method includes the newly created public video game channel in the local video game database 40.

At step 206, information about the newly created video game channel is pushed to the online video gaming database 42 and the "Needs To Be Updated" data entry in the corresponding database record associated with the newly created video game is set to "Yes." This signals the method that the information in the online video gaming database 42 needs to be pushed to all other local video gaming database databases.

At step 208, the method pushes the newly updated information in the online video gaming database to all other local video gaming databases that are connected via the communications network 36.

At step 210, the newly created video game channel information is included in the local video gaming database databases, and the local electronic programming guide information 34 associated with set-top box 30 is updated to reflect the new information.

The method ends at step 220.

FIG. 8B shows flow diagram 1000 which is one implementation of a flow diagram for the interplay between the online video gaming database and local video gaming database databases when creating a private video game channel. At step 240, the method starts.

At step 242, the user indicates that a private video game channel is to be created.

At step 244, the method includes the newly created private video game channel in the local video game database 40.

At step 246, information about the newly created video game channel is pushed to the online video gaming database 42 and the "Needs To Be Updated" data entry in the corresponding database record associated with the newly created video game is set to "Yes." This signals the method that the information in the online video gaming database 42 needs to be pushed to other local video gaming database databases.

At step 248, the method provides for the initiator of the private video game channel to send invitations to join the channel to other users. In one or more implementations, these invitations may take the form of an email with a key that authorizes the invitee to join the private channel, which the invitee uses to accept the invitation.

At step 250, if the user accepts the invitation, then the newly created private channel is included in the local video game database 40 within the set-top box of the user that has accepted the invitation.

At step 252, the method ends.

Figure 9:
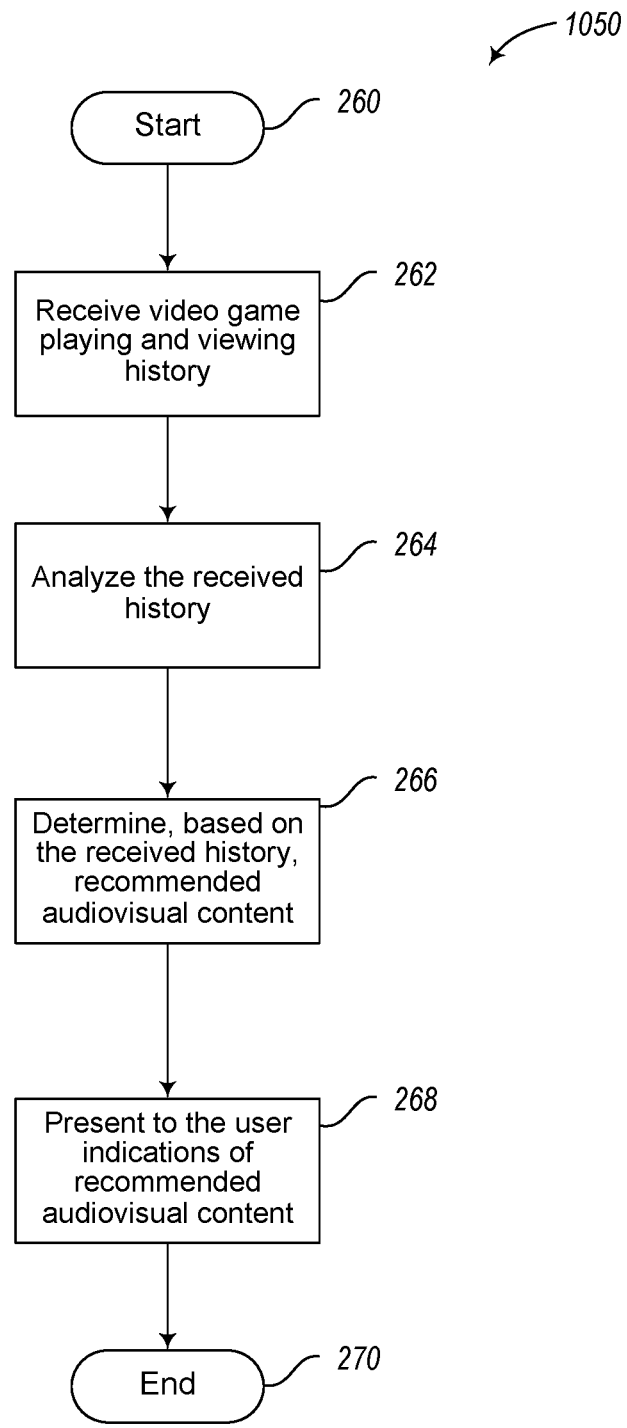
FIG. 9 shows an implementation of a flow diagram for determining and presenting recommendations for audiovisual content based on video game channels viewed or played.

FIG. 9 shows a flow diagram 1050 of one implementation of providing recommendations for audiovisual broadcast content to a user based on the user's video game playing and viewing history. At step 260, the method starts.

At step 262, the method receives video game playing and viewing history of the user 20. In one or more implementations, the video game channel playing and viewing history is tracked by the user's set-top box 30. In other implementations, the video game playing and viewing history may be tracked by the video game console 26, which may provide history data to the set-top box 30.

At step 264, the method analyzes the received history of the user's video game playing and viewing habits.

At step 266, the method determines, based on the received history, recommended audiovisual content. This may include broadcast content that corresponds to a subscription service from a television content provider. For example, if the user 20 plays predominantly sci-fi and adventure games such as "Halo", then the method may recommend sci-fi and adventure TV shows such as Star Trek™ and movies such as Guardians of the Galaxy™ to the user 20.

At step 268, the method presents to the user indications of the recommended audiovisual content. In one or more embodiments, the user 20 may be presented with an option to record the recommended content when it becomes available, be presented with an option to begin watching the recommended content immediately, or an option to be reminded when the recommended content is available for viewing at a later date.

The method ends at 270.

In one or more alternative implementations, video game channels maybe also recommended based on the viewing habits of broadcast television content or on the viewing or playing habits on other video game channels.

Figure 10:
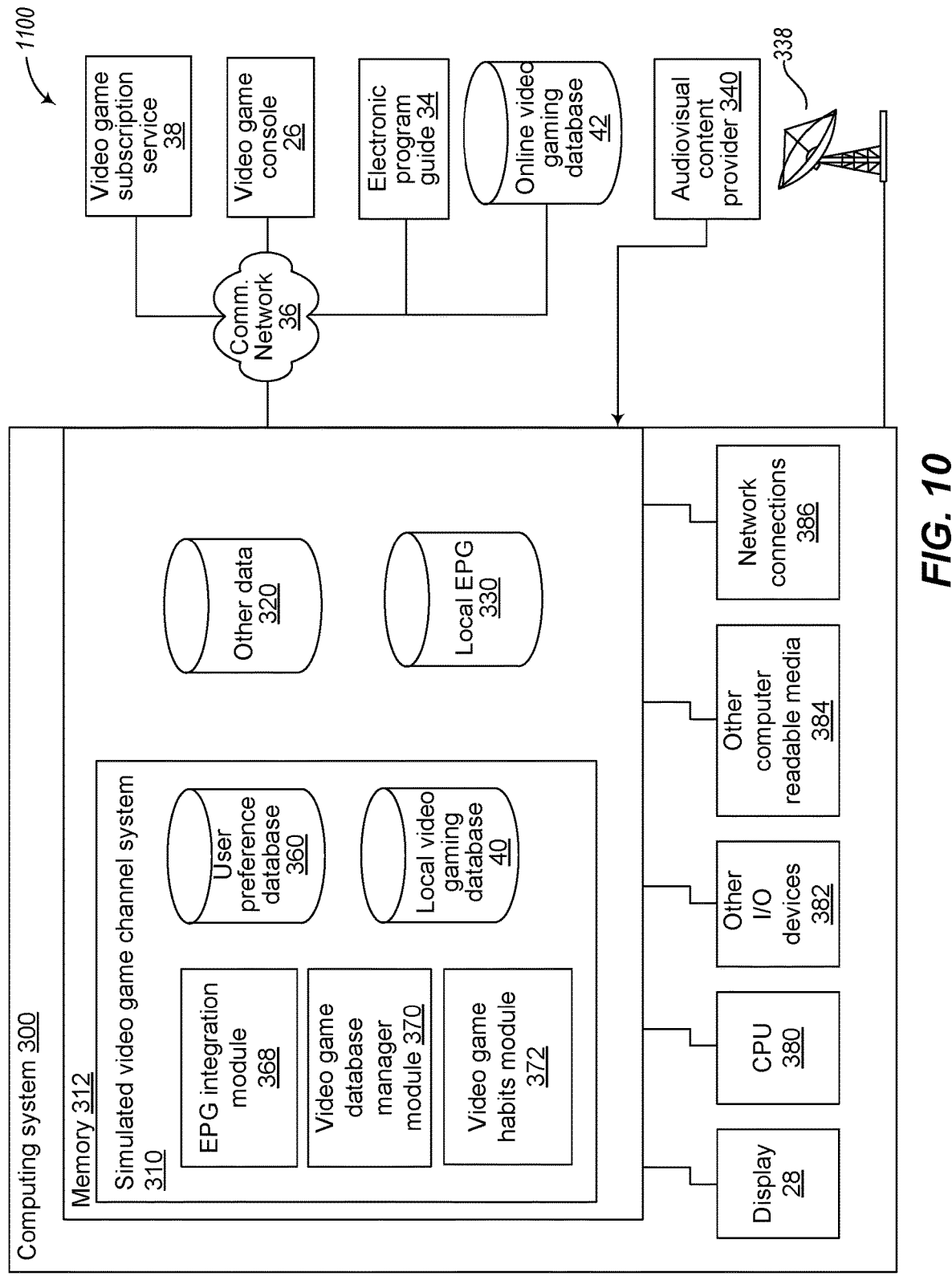
FIG. 10 is a schematic diagram of one implementation of a computing environment for systems and methods of providing a simulated video game channel.

FIG. 10 shows diagram 1100 of one implementation of a computing system for implementing a simulated video game channel system 310. FIG. 10 includes a computing system 300 that may be utilized to implement simulated video game channel system 310 with features and functions as described above. One or more general-purpose or special-purpose computing systems may be used to implement the simulated video game channel system 310. More specifically, the computing system 300 may include one or more distinct computing systems present having distributed locations, such as within a set-top box, or within a personal computing device. In addition, each block shown may represent one or more such blocks as appropriate to a specific embodiment or may be combined with other blocks. Moreover, the various blocks of the simulated video game channel system 310 may physically reside on one or more machines, which may use standard inter-process communication mechanisms (e.g., TCP/IP) to communicate with each other. Further, the simulated video game channel system 310 may be implemented in software, hardware, firmware or in some combination to achieve the capabilities described herein.

In the embodiment shown, computing system 300 includes a computer memory 312, a display 28, one or more Central Processing Units ("CPUs") 380, input/output devices 382 (e.g., keyboard, mouse, joystick, track pad, LCD display, smart phone display, tablet and the like), other computer-readable media 384 and network connections 386 (e.g., Internet network connections or connections to audiovisual content distributors). In other embodiments, some portion of the contents of some or all of the components of the simulated video game channel system 310 may be stored on and/or transmitted over other computer-readable media 384 or over network connections 386. The components of the simulated video game channel system 310 preferably execute on one or more CPUs 380 to create, manage and update the video game channels that are integrated with electronic programming guide information for audiovisual broadcast content, and to perform user habit analysis to determine recommended audiovisual events based on the users 20 video game watching or playing activity. Other code or programs 388 (e.g., a Web server, a database management system, and the like), and potentially one or more other data repositories 320, also reside in the computer memory 312, and preferably execute on one or more CPUs 380. Not all of the components in FIG. 10 are required for each implementation. For example, some embodiments embedded in other software do not provide means for user input, for display, for a customer computing system, or other components, such as, for example, a set-top box or other receiving device receiving audiovisual content.

In a typical embodiment, the simulated video game channel system-310 includes an EPG Integration Module 368, a video game database manager module 370 and a video game habits module 372. Audiovisual broadcast event content, including electronic programming guide (EPG) information is received from an audiovisual content provider 340, which may be provided by a network connection 386 or via satellite downlink 338. The video game database manager module 370 receives information from user 20, from the online video game database 42 and the local video game database 40 and appropriately synchronizes the databases across systems. The video game habits module 372 acquires and analyzes user 20 video game habits in order to determine recommendations for audiovisual content to present the user 20 at a later time. Other and/or different modules may be implemented. The simulated video game channel system 310 also, in some embodiments, contains the user preference database 360, which includes information to determine relevant filters to apply when creating information to be stored in the local EPG 330. In addition, the simulated video game channel system 310 interacts with communications network 36 in communicating with the video game subscription service 38, and in one or more implementations video game console 26, and electronic program guide 34.

The EPG integration module 368 performs at least some of the functions of EPG integration described with reference to FIGS. 1, 6A-6B and 8A-8B. In particular, the EPG integration module 368 interacts with electronic programming guide information 34 received from communications network 36 that reflects electronic programming guide information for audiovisual broadcast events received from the audiovisual content provider 340, e.g., DirecTV™ or Dish Network™. It also interacts with the online video gaming database 42 and local video gaming database 40 to receive information to populate the local EPG 330 with video game channels that are available to the user 20 to either view or to play. This way, the local EPG 330 has an integrated listing of audiovisual broadcast events, video-on-demand events, and video game channels available to the user.

The video game database manager module 370 performs at least some of the functions of database management described with reference to FIGS. 1 and 3-8. The module takes video game channel creation information from user 20, and uses that information to update the local video gaming database 40 and the online video gaming database 42 to ensure consistent and accurate EPG information with respect to video game channels are available throughout the network. Similarly, the video game database manager module 370 makes sure that changes reflected in the online video gaming database 42 are propagated to the local video gaming database 40.

The video game habits module 372 performs at least some of the functions of collecting and analyzing video game watching and playing habits of a user 20 as described with reference to FIGS. 1 and 9. The video game habits module 372 gathers and analyzes the video game channel viewing and playing habits of the user 20. In one or more implementations, this may include video games played on video game console 26 in direct connection to a video game subscription service 38 accessed via communications network 36 and not going through a set-top box 30. In other implementations, it includes video games that are watched or played using the simulated video game channel system implemented, for example, on set-top box 30. This module uses the gathered information to determine and to recommend to the user 20 the audiovisual broadcast content events or video-on-demand events that the user might be the most interested in viewing. In one or more implementations, this module presents the recommendation to the user either by immediately playing the recommended content, offering to record recommended content, or offering to remind user 20 when the content is available at a later date.

The video game habits module 372 may consider not only the title of the video games that have been played by the user 20, but also consider other attributes of the video games for example, by examining one or more genres of the video games to determine the user's 20 interest in that genre and to use that in the audiovisual recommendation. In addition, the module may also consider how the user 20 engages in the game, for example, if the user only views certain genres of games but actively participates in other genres. This is meant to be one non-limiting example of video game attributes that may be used by this module.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for providing a video game channel, comprising:
   a set-top box;
   a processor connected to the set-top box;
   a display connected to the set-top box;
   a communications network connected to the processor; and
   a non-transitory computer-readable memory communicatively coupled to the processor, the memory storing computer-executable instructions that, when executed, cause the processor to:
   receive an identification of a user;
   receive, from the communications network, an electronic programming guide, the guide including selections of audiovisual broadcast content channels and video game channels;
   display the received electronic programming guide to the user;
   receive, from the user, a request to access a video game channel from the displayed electronic programming guide;
   determine, based on the received request, access rights of the user to the video game channel;
   present, based on the determined access rights, the video game channel to the user; and display, to the user, indications of audiovisual content related to the requested video game channel.

2. The system of claim 1, wherein receiving from the user the request to access the video game channel, further includes:
   determining, based on the received user identification, private video game channels available to the user; and
   determining, based on the received user identification, public video game channels available to the user.

3. The system of claim 2, wherein presenting the video game channel to the user further incudes:
   if the received video game channel selection includes a request from the user to play on the video game channel and the determined access rights of the user to the video game channel allow the user to play on the video game channel, then:
      receiving video gaming inputs from a video gaming device;
      sending the received video gaming inputs to the communications network;
      receiving from the communications network audiovisual content of the video game channel; and
      outputting the audiovisual content of the video game channel.

4. The system of claim 1, wherein receiving from the user the request to access the video game channel further includes:
   receiving, from the user, a request to create a video game channel, the request including whether the channel is a public or private channel.

5. The system of claim 4, wherein receiving from the user the request to access the video game channel further includes:
   if the channel is a private channel, receiving, from the user, a list of other users to have access to the created video game channel, the list including access rights of each of the other users to the created video game channel;
   creating the channel as a private video game channel;
   updating the access rights of each of the other users to the created private video game channel; and
   storing the access rights of each of the users.

6. The system of claim 5, wherein updating the access rights of each of the other users further includes for each user:
   sending an invitation to the user to join the private video game channel; and
   receiving an acknowledgement from the user.

7. The system of claim 4, wherein receiving from the user the request to access the video game channel further includes:
   if the channel is a public channel, creating the channel as a public channel.

8. A method, comprising:
   receiving, from a communications network, contents of an electronic programing guide, the programming guide including indications of multiple channels that include audiovisual broadcast channels and a video game channel;
   sending the contents of the electronic programming guide for display to a viewer;
   receiving, from the viewer, an indication of the video game channel;
   receiving, from the communications network, content of the video game channel;
   sending the content of the video game channel to the viewer.

9. The method of claim 8, further comprising:
   receiving, from the viewer, an indication of whether the viewer wishes to play a video game associated with the video game channel; and
   if the viewer wishes to play the video game associated with the video game channel:
      receiving, from the viewer, an identification of the viewer;
      sending, by the communications network, the identification of the viewer to a video game provider of the video game;
      receiving, by the communications network, an indication of whether the viewer is allowed to play the video game; and
      if the viewer is allowed to play the video game:
         receiving from the viewer, video game commands,
         sending, by the communications network, the received video game commands,
         receiving, by the communications network, audiovisual content in response to the sent video game commands, and
         sending the received audiovisual content to the viewer.

10. The method of claim 8, further comprising:
    determining one or more audiovisual broadcast content items that are related to the video game channel; and
    sending an indication of the one or more audiovisual broadcast content items to the viewer.

11. The method of claim 8, further comprising:
    receiving, from the viewer, an indication of an audiovisual broadcast channel;
    determining one or more video game channels that are related to an audiovisual content event of the indicated audiovisual broadcast channel; and
    sending an indication of the one or more video game channels to the viewer.

* * * * *